Nov. 27, 1928.
F. C. MORRIS
1,692,852
OIL FILTER FOR ENGINES
Original Filed Nov. 25, 1925
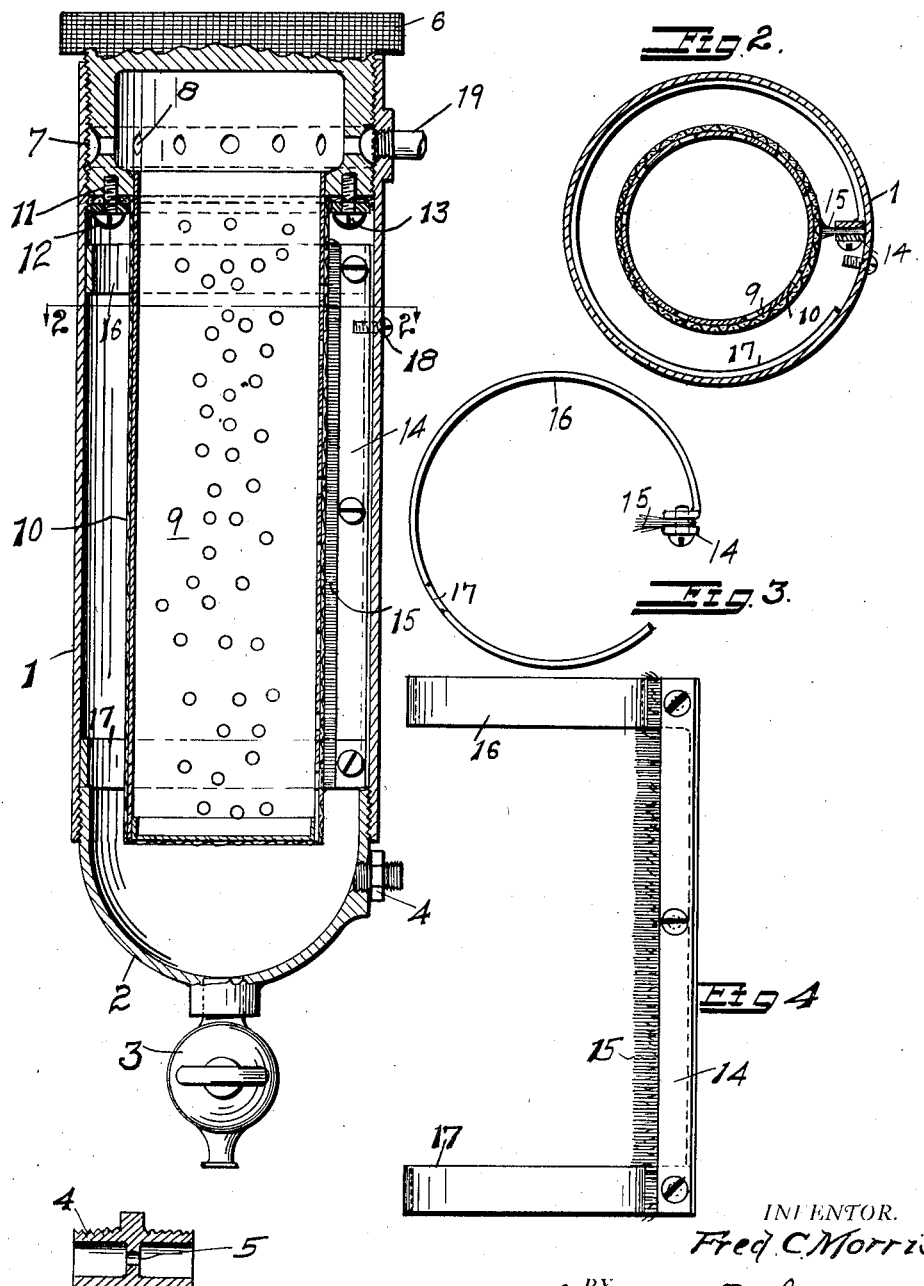

Patented Nov. 27, 1928.

1,692,852

UNITED STATES PATENT OFFICE.

FRED C. MORRIS, OF SAN FRANCISCO, CALIFORNIA.

OIL FILTER FOR ENGINES.

Application filed November 25, 1925, Serial No. 71,280. Renewed April 25, 1928.

This invention relates to an oil filter for engines, the object of which is to make a very efficient filter which will be small enough to be adapted to the use of automobile engines.

It will be understood by those skilled in the art, that in the operation of all kinds of engines where the oil is used over and over that the oil tends to pick up all kinds of extraneous matter, which interferes with the lubricating value of the oil, so it becomes necessary to remove as much of such impurities as possible if the highest efficiency of the lubricant is to be retained.

In the present instance another object of the invention is to provide means to clean the filter septum without opening the filter for a long period, the sludge collected therein being removed whenever necessary by opening a drain cock in the bottom of the filter, the filter having the minimum movable and other parts to effect the desired result, whereby there are only four openings into the filter casing, i. e. the two pipe connections, the top closure and the drain cock.

Another object of the invention is to provide a closure for the casing which also acts to clean the filter septum thereby eliminating one opening into the filter casing.

Another object of the invention is to produce a filter which can be attached to the usual engine oil pump and allow a percentage of the oil to by-pass through the filter without disturbing the usual operation of the pump, the filter septum being cleaned by simply turning the casing top one complete turn and then reseating it.

Another object of the invention is to provide means whereby the filter septum may be easily renewed when necessary, the filter cleaner being also removable from the filter when necessary.

Other objects of the invention will appear as the description proceeds.

An embodiment of the invention is as shown in the accompanying drawings, in which the same reference numeral is applied to the same portion throughout, but I am aware that there may be modifications thereof.

Fig. 1 is a vertical sectional view of the complete filter.

Fig. 2 is a horizontal plan view of the complete filter.

Fig. 3 is an end view of the brush showing one of the holders therefor.

Fig. 4 is a side elevation of the cleaning brush.

Fig. 5 is a sectional view of the fitting for the pipe leading from the oil pump to the filter.

The numeral 1, indicates a tube which is internally threaded at both ends. The tube receives a threaded bell shaped bottom 2 having a drain cock 3 and to which a fitting 4 is connected to receive the oil pipe leading to the pump. This fitting has a small opening therein at 5 to allow a small stream of oil from the pump to continually pass through the filter; said hole being small enough to prevent any serious loss to pressure in the pump pressure pipe. Since the pump receives its oil through a screen in the bottom of the engine case there is practically no danger of this small opening becoming clogged as it is ordinarily larger than the holes in the crank case screen.

At the top the tube 1 is closed by a cover 6 which is threaded for a considerable distance to allow the formation in the middle of the threaded portion of a groove 7 and into which several holes 8 extend. Attached to the cover is a screen tube 9 closed at the bottom, and over which is placed a cloth filter made of a material capable of withstanding the effect of the hot oil from the engine. The cloth filter fits the screen tube 9 tightly and it is held in place by means of a ring 11 which clamps its upper edges against the flange of the cover 6, two screws 12 and 13 holding the ring in place.

In order to provide for cleaning the filter cloth from time to time, there is a brush 14 carrying a series of stiff bristles which are long enough to engage the cloth when the brush is placed within the tube. The brush 14 has two flat spring rings, 16 and 17 connected thereto which hold it straight when placed within the tube, and to prevent the brush from turning the tube may be provided with a small set screw 18, although the springs are tight enough to almost insure against that themselves.

A pipe 19 may be connected with the tube 1 near the top and adjacent the groove 7 to allow the filtered oil to run back to the engine.

The operation of the apparatus is as follows: The fitting 4 is connected by a suitable tube with the pipe extending to the pressure indicator, or if an indicator is not used, to a pipe on the pressure side of the oil pump so that there is a continual flow of oil through the hole 5 to the filter. This hole will pass only from 5 to 10 percent of the oil pumped, but that will be sufficient to keep the entire body of oil free from objectionable particles which reduce its lubrication qualities.

The sludge will tend to collect on the filter, but the continued agitation of the filter due to the car movement, where the filter is used on an automobile engine will cause some of the sludge to drop off and fall into the bottom 2. All of the sludge, however, will not drop off and from time to time the filter cloth should be cleaned, when the engine is not running, by turning the top 6 a turn or two in one direction and then back to its initial position, whereupon the brush will clean the filter's cloth.

From time to time the sludge can be drained out by opening the drain cock 3, and if the filter cloth needs renewing the top may be taken out altogether and a new cloth placed on the screen 9.

It will be seen that an important feature of this filter is that the hole 5 must be proportioned to the oil pump capacity in such a manner as to filter enough oil to keep the mass clean, while not interfering with the pump pressure required to lubricate the engine.

What I claim is as follows, but various modifications may be made in the construction shown in the drawings and above particularly described form, within the purview of the claims:

1. An oil filter for engines comprising a tube internally threaded at one end, a threaded cover for said tube, a screen tube fixed to said cover, a cloth cover for said screen adapted to be clamped to said threaded cover, a brush adapted to bear on said cloth, a flat spring ring at each end of said brush, said rings adapted to frictionally engage the inside of said tube, and a bell shaped member for the bottom of said tube.

2. An oil filter for engines, comprising a tubular closed receptacle, inlet and discharge pipes connected thereto, a screw top for the receptacle, a tubular screen secured to, and depending from said screw top, a filter septum secured to the outside of said screen tube, the screw top having a groove around the same, and openings through it to same groove to permit liquid passing through the filter to pass to the discharge pipe, and a fixed cleaner inside the receptacle whereby the filter septum may be cleaned by rotating the screw top and filter.

In testimony whereof I have hereunto set my hand this 30th day of October A. D. 1925.

FRED C. MORRIS.